US012806829B2

(12) United States Patent
Horch et al.

(10) Patent No.: US 12,806,829 B2
(45) Date of Patent: Nov. 24, 2026

(54) APPARATUSES FOR FORMING COVERS FOR CUSHIONS

(71) Applicant: Purple Innovation, LLC, Lehi, UT (US)

(72) Inventors: Chad M. Horch, Lehi, UT (US); Michael A. Pierce, American Fork, UT (US)

(73) Assignee: Purple Innovation, LLC, Draper, UT (US)

(*) Notice: Subject to any disclaimer, the term of this patent is extended or adjusted under 35 U.S.C. 154(b) by 133 days.

(21) Appl. No.: 18/604,924

(22) Filed: Mar. 14, 2024

(65) Prior Publication Data

US 2025/0289170 A1 Sep. 18, 2025

(51) Int. Cl.

| | |
|---|---|
| ***B29C 45/14*** | (2006.01) |
| *B29K 105/00* | (2006.01) |
| *B29L 31/58* | (2006.01) |

(52) U.S. Cl.

CPC .. *B29C 45/14065* (2013.01); *B29C 45/14786* (2013.01); *B29C 2045/14131* (2013.01); *B29C 2045/14139* (2013.01); *B29K 2105/0061* (2013.01); *B29L 2031/58* (2013.01)

(58) Field of Classification Search

CPC ........ B29C 45/14065; B29C 45/14786; B29C 45/14418; B29C 45/14336; B29C 2045/14131; B29C 2045/14139

See application file for complete search history.

(56) References Cited

U.S. PATENT DOCUMENTS

| | | | | |
|---|---|---|---|---|
| 4,824,070 A * | 4/1989 | Mizuno | B29C 44/143 | 425/117 |
| 4,968,235 A | 11/1990 | Nakane et al. | | |
| 5,007,815 A * | 4/1991 | Shoji | B29C 33/14 | 425/117 |
| 5,130,074 A * | 7/1992 | Sakamoto | B29C 44/56 | 264/46.4 |

(Continued)

FOREIGN PATENT DOCUMENTS

| | | | |
|---|---|---|---|
| DE | 10126991 | * | 12/2002 |
| JP | S58-065637 A | | 4/1983 |

OTHER PUBLICATIONS

International Search Report on PCT PCT/US2025/019782 dated Jul. 17, 2025 (13, pages).

*Primary Examiner* — Edmund H Lee

(74) *Attorney, Agent, or Firm* — Foley & Lardner LLP

(57) ABSTRACT

A method for manufacturing a cover for a primary cushion includes at least partially assembling the cover and placing the cover in a mold. The mold may include one or more receptacles that receive edges, seams, and any other protruding features of the cover to enable the mold to be closed as tightly as possible over panels of the cover on which a molded article is to be formed. With the cover and mold assembled, a molded article may be molded onto at least one panel of the cover. The cover with the molded article formed thereon and secured thereto may then be removed from the mold and assembled with the primary cushion. The cover may comprise a cover for a pillow. The molded article may comprise a secondary cushion, which may be formed from an elastomeric gel. Molds and mold assemblies are also disclosed.

13 Claims, 5 Drawing Sheets

(56) References Cited

U.S. PATENT DOCUMENTS

| | | | | |
|---|---|---|---|---|
| 5,689,137 | A * | 11/1997 | Weber | B29C 45/14655 257/667 |
| 5,927,505 | A * | 7/1999 | Chia | B29C 45/14418 257/730 |
| 2008/0036110 | A1 | 2/2008 | Brooker et al. | |
| 2011/0025098 | A1 * | 2/2011 | Ballesteros | B29C 45/14418 296/203.02 |
| 2016/0262561 | A1 | 9/2016 | Pearce et al. | |
| 2023/0142851 | A1 | 5/2023 | Taylor et al. | |

* cited by examiner

APPARATUSES FOR FORMING COVERS FOR CUSHIONS

TECHNICAL FIELD

This disclosure relates generally to secondary cushions onto covers for cushions and, more specifically, to methods for manufacturing secondary cushioning elements on covers for cushions. Even more specifically, this disclosure relates to manufacturing methods that include molding secondary cushions onto pre-manufactured covers for cushions. A mold for defining a secondary cushion on a cover for a cushion may include one or more recesses that receive features of the cover, such as seams, fasteners (zippers, button holes and/or buttons, etc.).

RELATED ART

U.S. Patent Application Publication US 2023/0142851 A1 discloses a cover for a cushion, such as a pillow. The cover includes a pair of superimposed panels with peripheries that at least partially are secured to each other. The panels define an interior of the cushion, which comprises a primary receptacle for a primary cushion (e.g., the pillow). At least one of the panels includes two layers that define a pocket, within which a thinner secondary cushion is located. The secondary cushion may be secured to or formed on a layer of the panel. The layer may then be cut and assembled with (e.g., sewn to, etc.) the other layer of the panel and/or a remainder of the cover.

The presence of a somewhat bulky, weighty secondary cushion on the layer of the panel complicates handling of the layer during its assembly with the other layer of the panel of the cover and the remainder of the cover. In particular, the secondary cushion adds a significant amount of weight to the layer, which renders the layer difficult to move. In addition, a size of the secondary cushion may interfere with the assembly process. For example, when seams are formed adjacent to the secondary cushion, the presser foot and needle of a sewing machine are brought close to the secondary cushion. If the presser foot or needle contacts the secondary cushion while sewing the seam, the seam and the secondary cushion may be ruined. The presence of a secondary cushion on a layer that is being assembled with other layers and component of a cover for a cushion undesirably adds to manufacturing time and undesirably decreases manufacturing yields.

SUMMARY

A method for manufacturing a cover for a primary cushion includes assembling the cover with a mold and then molding at least one secondary cushion onto the cover. The cover may be at least partially assembled before molding the at least one secondary cushion onto it. In some embodiments, the cover may be completely assembled before molding the at least one secondary cushion onto it. Thus, each secondary cushion may be molded onto a pre-manufactured cover.

Such a method may include assembling a cover with a mold, or positioning the cover within the mold. The cover may include a first panel, a second panel secured to the first panel (e.g., superimposed with the first panel, etc.), and a seam securing at least one edge of the first panel to the second panel. Each panel may include a single layer or a plurality of layers of a material (e.g., a fabric, a polymer film, etc.). In embodiments where the mold includes two halves, the cover may be assembled with a half of the mold, or positioned on or within the half of the mold. The cover may be assembled with the mold so the first panel and second panel lay flat against inner surfaces of the mold and at least one of the first panel and the second panel is exposed to one or more cavities of the mold (e.g., the first panel but not the second panel is exposed to a cavity of the mold, each of the first panel and the second panel is exposed to a cavity of the mold, the second panel but not the first panel is exposed to a cavity of the mold). Assembly of the cover with the mold may also include positioning the seam and any other features of the cover that may protrude beyond the flattened panels of the cover (e.g., a fastener (e.g., a zipper, buttons and buttonholes, touch fasteners, etc.), tags, etc.) within a receptacle in the mold (e.g. a receptacle within at least one half of the two halves of the mold, etc.). Each receptacle in the mold accommodates seams and other protruding features of the cover in a manner that enables the mold to completely flatten remaining portions of the panels of the cover and, thus, effectively seal the one or more cavities of the mold. In embodiments where the mold includes two halves, the two halves of the mold may be pressed together with the cover between them.

Once the cover and mold are assembled, an elastomeric gel may be introduced into the one or more cavities of the mold. The elastomeric gel may be heated to a high temperature and introduced into the one or more cavities of the mold under high pressure (e.g., by injection molding, etc.). Thus, the elastomeric gel may be in a liquid state as it enters the one or more cavities of the mold and contacts the portions of the first panel or second panel of the cover that are exposed to the one or more cavities of the mold. While in the liquid state, the elastomeric gel may flow onto the portions of the first panel or the second panel of the cover that are exposed to the one or more cavities of the mold. In some embodiments (e.g., embodiments where the first panel or the second panel comprises a fabric, is porous, etc.), the elastomeric gel in the liquid state may wick into and, thus, impregnate the portions of the first panel or second panel of the cover that are exposed to the one or more cavities of the mold. The elastomeric gel then cools and solidifies. In embodiments where the elastomeric gel has impregnated the portions of the first panel or second panel of the cover that are exposed to the one or more cavities of the mold, as the elastomeric gel cools, it may mechanically couple to the first panel or the second panel. Regardless of whether the elastomeric gel impregnates portions of the first panel or the second panel, the elastomeric gel may adhere to the portions of the first panel or the second panel that are exposed to the one or more cavities as it cools.

Once the elastomeric gel has cooled and at least partially solidified, the cover and each newly formed secondary cushion may be removed from the mold. As the cover is removed from the mold, each secondary cushion remains on the cover. For example, the elastomeric gel of the secondary cushion may mechanically secure, adhere, or otherwise secure the secondary cushion to the cover.

A mold assembly for use in manufacturing a cover for a cushion includes a mold that receives a cover for a primary cushion. A configuration of the mold may enable it to form a secondary cushion on a cover that has been partially assembled or completely assembled, with a plurality of panels of the partially or completely assembled cover having already been secured (e.g., sewn, adhered, welded, bonded, etc.) together. Each panel may include one or more layers of material (e.g., a fabric, a polymer film, etc.).

The mold includes at least one cavity positionable over at least one panel of the cover. The mold also includes at least one receptacle, which may receive one or more features of the cover that protrude beyond a thickness of the panels of the cover (e.g., seams, fasteners, tags, etc.). The at least one receptacle may be out of communication with the at least one cavity, which may prevent material that is introduced into the at least one cavity from entering the at least one receptacle.

In some embodiments, the mold may include a first mold half and a second mold half. The first mold half may include a first cavity and a first receptacle. The first receptacle may be out of communication with the first cavity. The second mold half may include a second receptacle. Optionally, the second mold half may also include a second cavity, which may be out of communication with the second receptacle. The second mold half may be assembled with (e.g., superimposable with, etc.) the first mold half. In an assembled relationship of the first mold half and second mold half, the first receptacle and second receptacle may be superimposed with each other, enabling them to collectively receive features that protrude beyond the thickness of the panels of the cover. In embodiments where the second mold half includes a second cavity, the second cavity may be a mirror image of the first cavity; the second cavity may have the same configuration as the first cavity, but be laterally offset from the first cavity when the first mold half and second mold half are assembled with each other; or the second cavity may be configured differently from the first cavity.

A shape of the cavity of the mold (e.g., of the first cavity of the first mold half, of the second cavity of the second mold half, etc.) may define the shape of a secondary cushion to be formed on a panel of the cover. Without limitation, the cavity may have the shape of a grid (e.g., a hexagonal grid, a square grid, a diamond grid, a triangular grid, an octagonal pattern, a circular pattern, etc.).

Optionally, the mold assembly may also include the cover.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
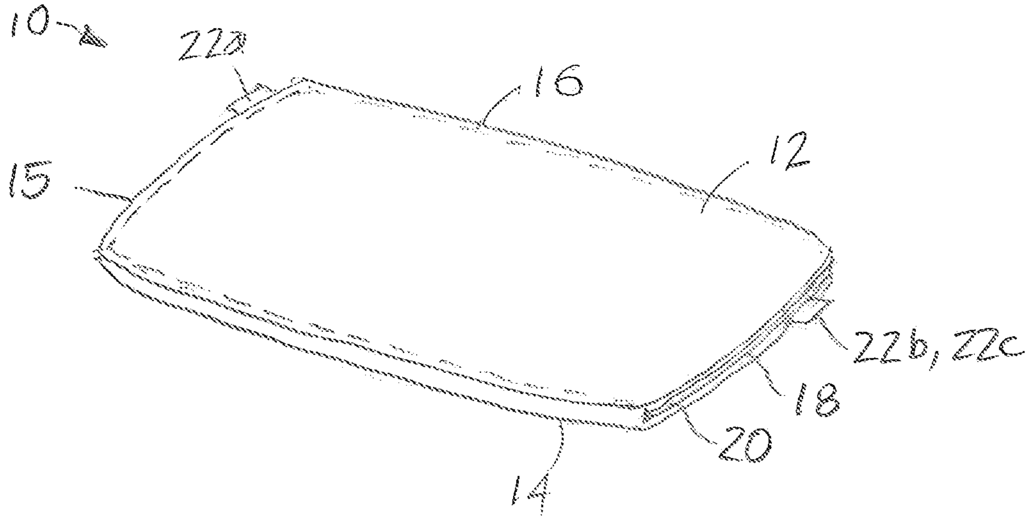
FIG. 1 is an isometric representation of a cover for a cushion.
Figure 2:
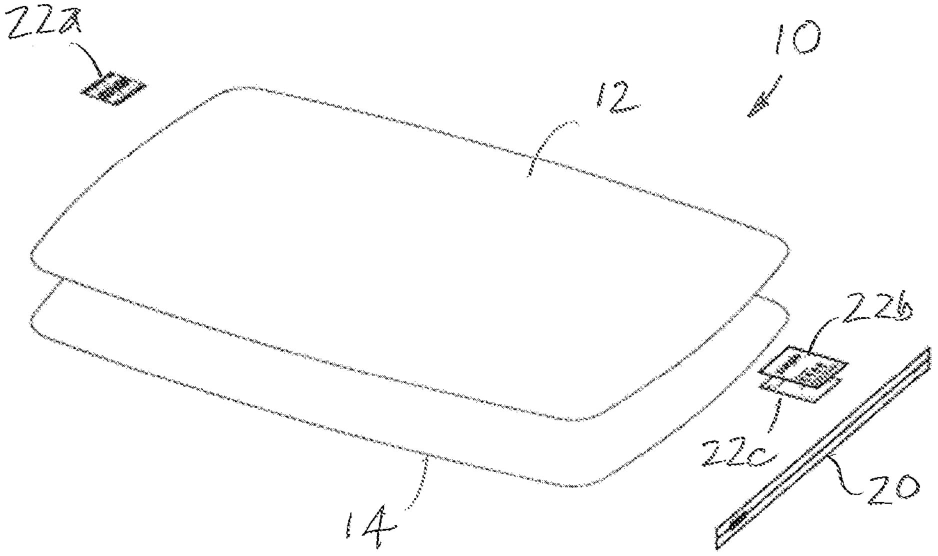
FIGS. 2 and 3 are exploded views of the cover shown in FIG. 1.

With reference to FIGS. 1-5, an embodiment of a cover 10 for a cushion (not shown) is depicted. A configuration of the cover 10 may enable it to be used with a particular type of cushion. The cushion the cover is designed for use with is referred to herein as a "primary cushion." Without limitation, the cover 10 may be configured for use with a pillow (as depicted), a seat cushion, a mattress, a mattress topper, or the like. The cover 10 may be partially assembled or completely assembled. The cover 10 includes a plurality of panels 12 and 14, as well as a seam 16 (FIG. 4) securing the panels 12 and 14 together. Optionally, the cover 10 may include one or more of an opening 18, one or more fasteners 20, and one or more tags 22.

As illustrated, the panels 12 and 14 of the cover 10 may be superimposed with each other, although covers 10 with other arrangements of panels 12 and 14 (e.g., adjacent panels 12 and 14, etc.) are also within the scope of this disclosure. Each panel 12, 14 may include one or more layers of a pliable material. Examples of suitable pliable materials include, without limitation, fabrics and polymer films. In a more specific embodiment, each panel may comprise a cotton or a stretchable cotton blend, such as a so-called "scrim fabric."

The seam 16 (FIG. 4) may be formed in any manner acceptable for the type of material(s) from which the panels 12 and 14 of the cover 10 are formed. For example, the seam 16 may be sewn (e.g., with a suitable thread, etc.). As another example, the seam 16 may comprise a weld. In other examples, the seam 16 may be formed by an adhesive material, by bonding materials of the panels 12 and 14 together, or in any other suitable manner.

The optional opening 18 of the cover 10 may be defined as a location where peripheries of the panels 12 and 14 are not secured together by the seam 16. A size of the opening 18 may enable it to receive the primary cushion with which the cover 10 is designed to be used. Thus, the opening 18 may enable the cover 10 to be placed over or removed from the primary cushion. The opening 18 may also enable the cover 10 to be pulled inside-out, or have its inner surfaces turned outward.

In embodiments where the cover 10 includes an opening 18, it may also optionally include a fastener 20. The fastener 20 may facilitate closing and reopening of the opening 18. As an example and as illustrated, the fastener 20 may comprise a zipper. Alternatively, the fastener 20 may comprise a touch fastener (e.g., a Velcro, or hook and loop fastener; a hook-hook fastener; etc.), buttons and corresponding buttonholes, or the like.

As yet another option, the cover 10 may include one or more tags 22. The tags 22 may comprise one or more of a brand tag 22*a*, a care tag 22*b*, a legal tag, or law label 22*c*, a vendor tag, or the like. Each tag 22 may extend from a periphery of the cover 10 or it may be secured to a panel 12, 14 of the cover 10.

The seam 16 and any opening 18, fastener 20, tag 22, an outer edge 15 of the cover 10, or any other feature that exceeds a thickness of the panels 12, 14 as they lay flat, whether superimposed or not, may be referred to herein as a "protruding feature" of the cover 10.

Figure 3:
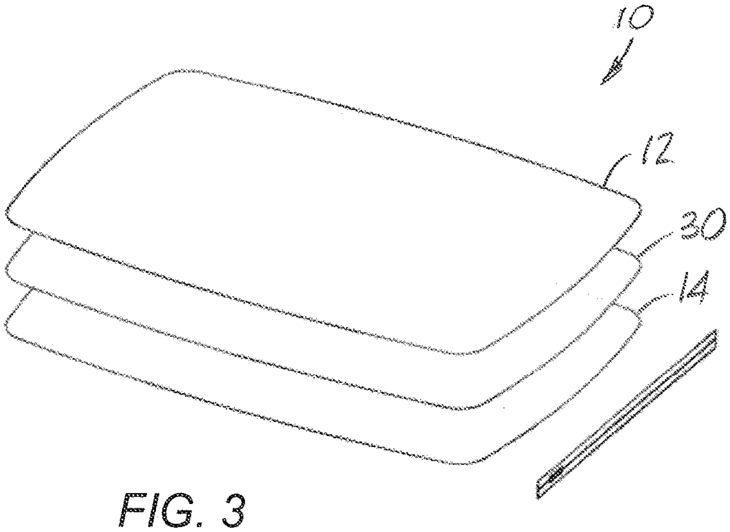
Figure 4:
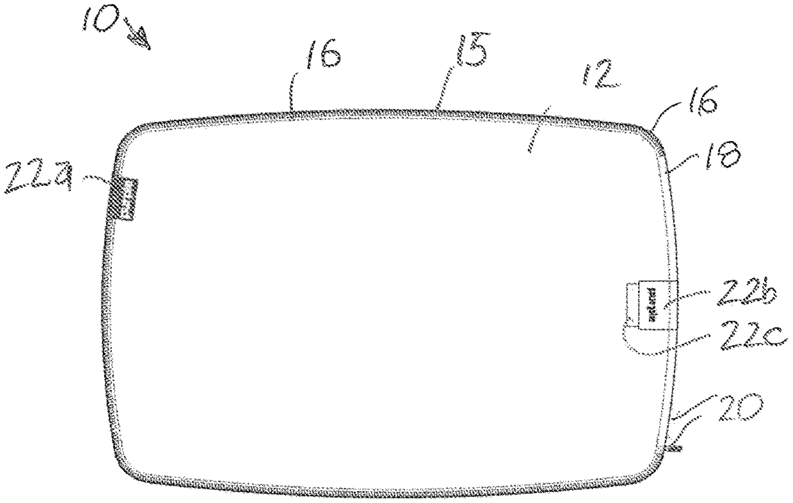
FIG. 4 is a plan view of a first major surface (e.g., top, bottom, etc.) of the cover shown in FIG. 1.
Figure 5:
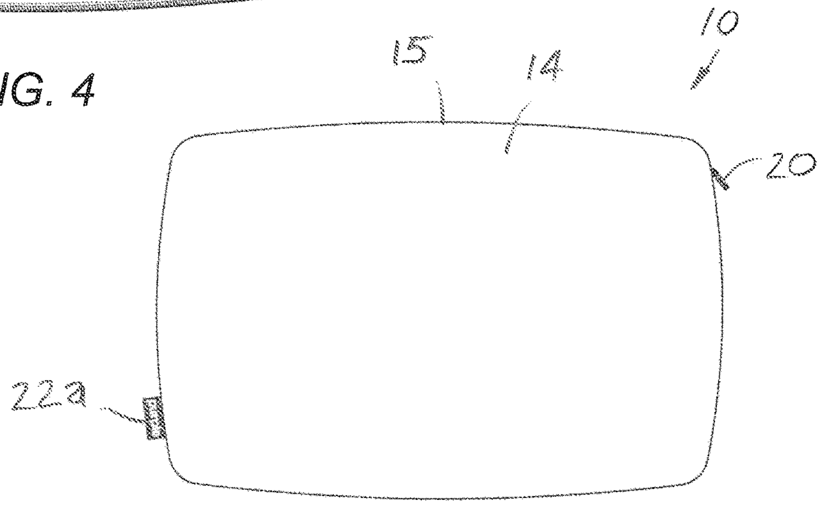
FIG. 5 is an isometric view of a second major surface (e.g., bottom, top, etc.) of the cover shown in FIG. 1.
Figure 6:
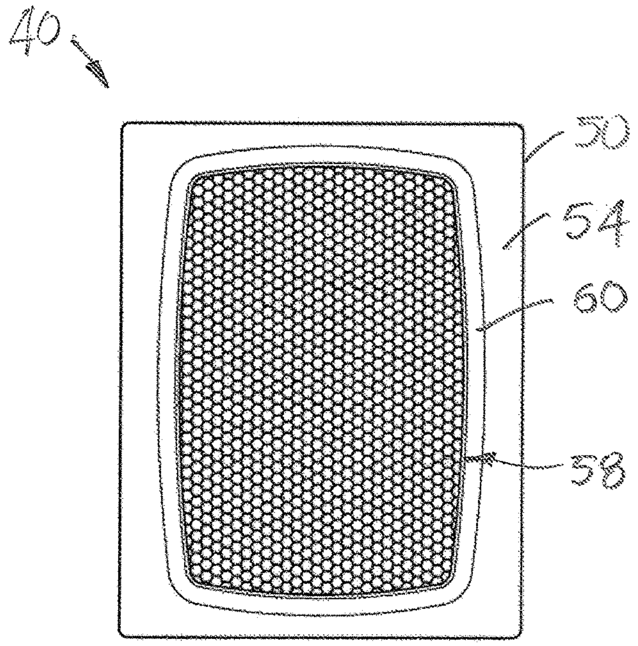
FIG. 6 provides a plan view of an interior surface of a mold half, showing a cavity and a receptacle formed in the interior surface of the mold half.
Figure 8:
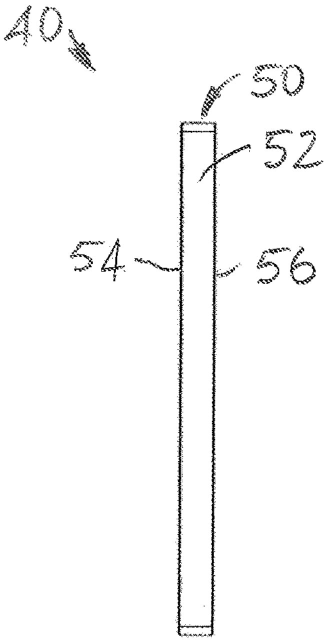
FIG. 8 is a side view of the mold half shown in FIG. 6.
Figure 7:
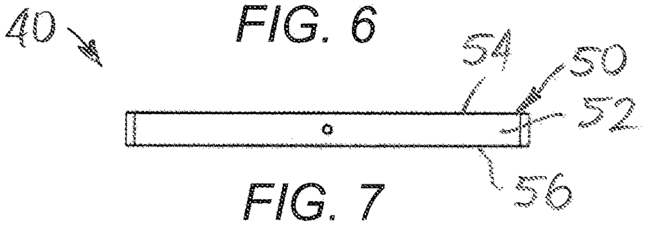
FIG. 7 is an end view of the mold half shown in FIG. 6.
Figure 9:
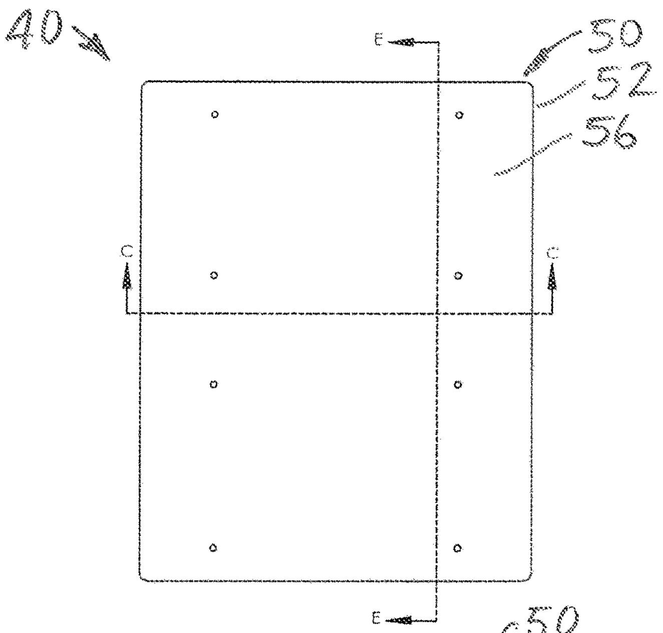
FIG. 9 provides a plan view of an exterior surface of the mold half shown in FIG. 6.
Figure 11:
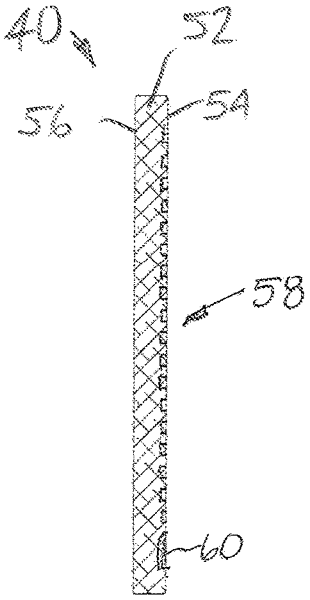
FIG. 11 is another cross-section of the mold half, taken along line E-E of FIG. 9.
Figure 10:
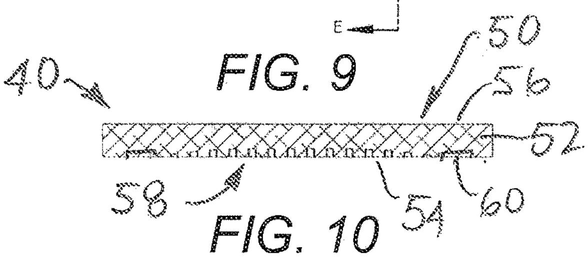
FIG. 10 is a cross-section of the mold half, taken along line C-C of FIG. 9.

As illustrated by FIG. 3, a barrier 30 may be superimposed with and placed adjacent to a panel 12, 14 of the cover 10. In embodiments where the panels 12 and 14 are superimposed, the barrier 30 may be placed between the panels 12 and 14. The barrier 30 may comprise a sheet or film of a pliable material, such as a paper (e.g., wax paper, etc.), a polymer, or the like. The barrier 30 may be secured in place as the cover 10 is assembled. For example, the seam 16 of the cover 10 may secure the barrier 30 to at least one panel 12, 14. Thus, the barrier 30 may be secured to at least one panel at the same time and in the same manner as the panel 12, 14 is secured to another panel 14, 12. As will become more apparent from the ensuing description, the barrier 30 may comprise a material that may prevent another material, such as an elastomeric gel, that is applied to one side of a panel 12, 14 and may bleed through the panel 12, 14 from adhering the panel 12, 14 to an object (e.g., another panel 14, 12, etc.) on the other side of the panel 12, 14. The barrier 30 may be removable from the panel 12, 14; for example, from between superimposed panels 12 and 14. For example, the barrier 30 may be removed by grasping the barrier 30 and tearing it along the seam 16, where it may be secured to at least one panel 12, 14.

Turning now to FIGS. 6-11, an embodiment of a mold 40 for forming a molded article 70 (FIG. 15), such as a secondary cushion, on a cover 10 (FIGS. 1-5) is depicted. The mold 40 may have a configuration that enables it to be used to form the molded article 50 on the cover 10 a suitable type of molding equipment employing a desired technique. In embodiments where the molded article 70 is a secondary cushion made from an elastomeric gel (e.g., an extended block copolymer (e.g., an A-B block copolymer, an A-B-A triblock copolymer, etc.), such as those disclosed by U.S. Pat. Nos. 6,413,458, 6,797,765, and 7,964,664, the entire disclosures of which are hereby incorporated herein), a configuration of the mold 40 may enable it to be used with and injection molding machine.

Figure 12:
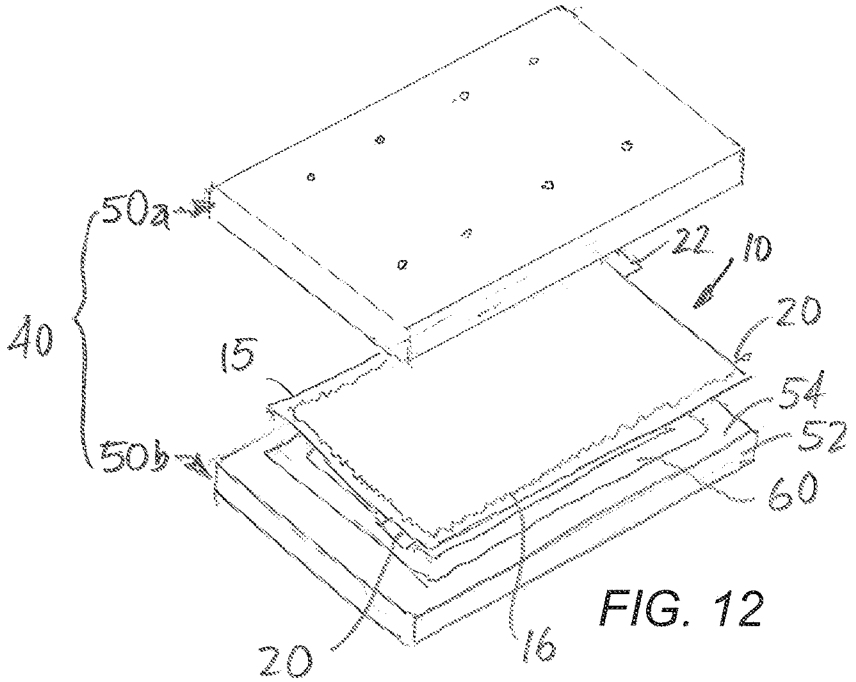
FIG. 12 illustrates a cover for a cushion being positioned relative to a mold.
Figure 13:
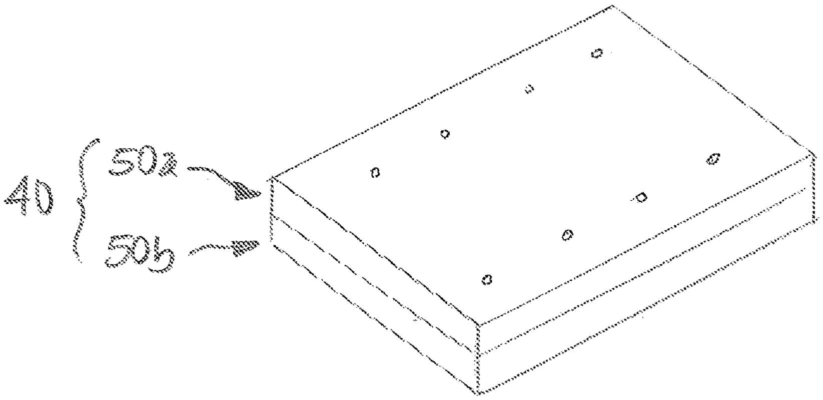
FIG. 13 illustrates assembly of the mold and the cover.
Figure 14:
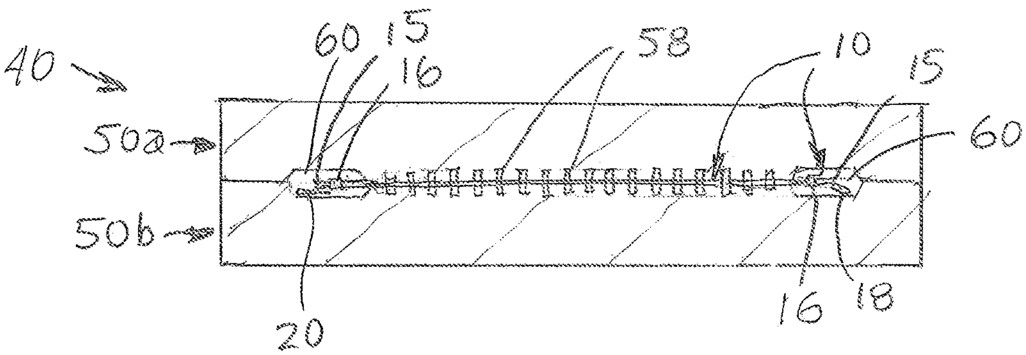
FIG. 14 is a cross-sectional representation showing the assembly of the mold and the cover.

Briefly referring to FIGS. 12-14, the mold 40 may comprise a first mold half 50*a* a second mold half 50*b*, each of which may be referred to as a "mold half 50" for the sake of simplicity.

With returned reference to FIGS. 6-11, each mold half 50 includes a body 52 with an inner surface 54 and an outer surface 56. At least one cavity 58 may be formed in the inner surface 54 of at least one mold half 50. At least one receptacle 60 may be formed the inner surface 54 of each mold half 40. The outer surface 56 and body 52 of each mold half 50 may include features (e.g., recesses, orifices, etc.) that enable the mold half 50 to be coupled to and used with appropriate molding equipment (e.g., an injection molding machine, etc.).

The at least one cavity 58 may be recessed within the inner surface 54 of the body 52 of at least one mold half 50. The at least one cavity 58 receives a molding medium (e.g., an elastomeric gel, etc.) from at least one conduit (not shown) and one or more openings (not shown) in the body 52 of the mold half 50, which, in turn, receive the molding medium from the molding equipment which the mold 40 is assembled. A shape of the at least one cavity 58 will define a shape of the molded article 70 (FIG. 15) on the cover 10 (FIGS. 1-5). As illustrated, the at least one cavity 58 may have the shape of a grid (e.g., a hexagonal grid, a square grid, a diamond grid, a triangular grid, a circular grid, etc.) or any other suitable shape.

The mold 40 may be used to form a molded article 70 (FIG. 15) on only one side of the cover 10 (FIGS. 1-5). In such an embodiment, at least one cavity may be provided in the inner surface 54 of the body 52 of only one mold half 50 of the mold 40. Alternatively, the mold 40 may be used to form molded articles 70 on opposite sides of the cover 10. In such an embodiment, at least one cavity 58 may be provided in the inner surfaces 54 of the bodies 52 of both mold halves 50.

The at least one receptacle 60 may be recessed in the inner surface 54 of the body 52 of each mold half 50. A position, shape, and dimensions of the at least one receptacle 60 may enable it to receive all of the protruding features (e.g., the seam 16, any openings 18, any fasteners 20, any tag(s) 22, etc.) of the cover 10. As depicted, the at least one receptacle 60 may be positioned laterally outside of at least one cavity 58, if any, in the inner surface 54. When the at least one receptacle 60 is positioned adjacent to a cavity 58, the at least one receptacle 60 may be laterally isolated from the cavity 58, or the at least one receptacle 60 may be placed out of communication with the cavity 58.

Figure 15:
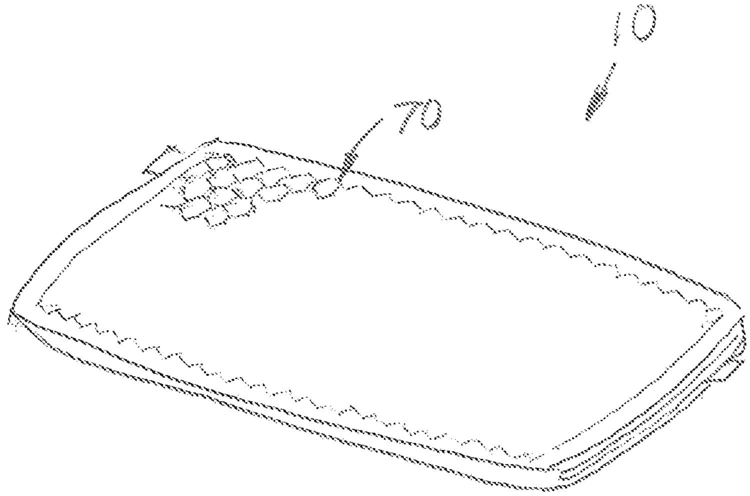
FIG. 15 illustrates an article of manufacture that includes the cover and a secondary cushion molded onto the cover.

Referring now to FIGS. 12-15, a method for forming a molded article 70 on a cover 10 is illustrated. The method includes: opening a mold 40 and orienting the cover 10 relative to the mold 40, as illustrated by FIG. 12; assembling the mold 40 over the cover 10, or closing the mold 40, as illustrated by FIGS. 13 and 14; introducing a molding medium into the mold 40 and onto the cover 10 to form the molded article 70; and opening the mold and removing the cover 10 and each molded article 70 on the cover 10 from the mold 40, as illustrated by FIG. 15.

With returned reference to FIG. 12, the mold 40 may be opened by separating two mold halves 50*a* and 50*b* of the mold 40 and spacing the mold halves 50*a* and 50*b* apart from each other. Separation of the mold halves 50*a* and 50*b* from each other may be accomplished with molding equipment (not shown). With the mold 40 open, or the mold halves 50*a* and 50*b* separated and spaced apart from each other, the cover 10 may be positioned between the mold halves 50*a* and 50*b*. By way of example, the cover 10 may be positioned over and secured in place relative to the inner surface 54 of the body 52 of one mold half 50*b*. More specifically, any protruding features of the cover 10, such as the outer edge 15, the seam 16, any opening(s) 18, any fastener(s) 20, and any tag(s) 20 may be placed within and/or completely superimposed with the at least one receptacle 60 in the inner surface 54 of the body 52 of the mold half 50*b*. A remainder of each panel 12, 14 of the cover 10 and any barrier 30 may be smoothed out in such a way that portion(s) of each panel 12, 14 and any barrier 30 that overlie the at least one cavity 58 in the inner surface 54 lie substantially flat over the inner surface 54. Positioning of the cover 10 may be manual or automated (e.g., occur with robotic tooling, etc.). The mold 40 (e.g., the mold half 50*b*, etc.) may include one or more guides (e.g., pins, etc.) that engage corresponding features (e.g., holes, etc.) of the cover 10. Such a guide may ensure that the positioning of covers 10 within the mold 40 is consistent with repeated use of the mold 40.

The cover 10 may be held in place relative to the mold 40 (e.g., the mold half 50*b*, etc.) with a suitable fastener (not shown). Without limitation, the fastener may comprise a guide, an adhesive, a clamp, a vacuum, or the like.

With the cover 10 securely in place relative to the mold 40 (e.g., the mold half 50*b*, etc.), the mold 40 may be closed over the cover 10, as shown in FIGS. 13 and 14. As the mold 40 is closed, the cover 10 may be effectively sealed therein. For example, as the mold halves 50*a* and 50*b* are assembled over the cover 10, protruding features of the cover 10 reside within the at least one receptacle 60, enabling the inner surfaces 54 of the bodies 52 of the mold halves 50*a* and 50*b* to be positioned as closely as possible to one another, and effectively sealing each cavity 58 over a panel 12, 14 of the cover 10.

With the cover 10 and mold 40 properly assembled, a molding medium may be introduced into each cavity 58 of the mold 40 and onto a panel 12, 14 of the cover 10. As a nonlimiting example, an elastomeric gel may be introduced into each cavity 58 of the mold 40 and onto the panels 12 and 14 of the cover 10. In embodiments where one or more of the panels 12 and 14 comprises a fabric (e.g., a scrim fabric, etc.), the elastomeric gel may wick or seep into the fabric. Thus, the elastomeric gel may mechanically bond to the panel 12, 14. Regardless of whether the elastomeric gel wicks or seeps into a panel 12, 14, the elastomeric gel may adhere to the panel 12, 14.

As the molding medium cools, it solidifies to form at least one molded article 70 on the cover 10. Once the molding medium has sufficiently solidified, the mold 40 may be opened and the cover 10 and each molded article 70 on the cover 10 may be removed from the mold 40. FIG. 15 illustrates a cover 10 with molded articles 70 formed thereon. The cover may comprise a cover of the type described by U.S. Patent Application Publication US 2020/0390247 A1, the entire disclosure of which is hereby incorporated herein.

Optionally, the cover 10 may then be turned inside-out, or have its inner surfaces turned outward, which positions the molded articles 70 inside the cover. Additionally, turning the cover 10 inside out may position any barrier 30 on an outside of the cover 10. The barrier 30 (FIG. 3), if any, may then be removed from the cover 10. In embodiments where the barrier 30 was assembled with the cover 10 while manufacturing the cover 10, the barrier 30 may be removed by tearing it along the seam 16 of the cover 10.

The cover 10 may then be assembled with a primary cushion (not shown). In embodiments where the cover 10 comprises a cover for a pillow, any fasteners 20 (FIG. 1) of the cover 10 may be opened and the primary cushion may be inserted into the cover 10 through the opening 18. The fasteners 20, if any, may then be closed to secure the primary cushion within the cover 10.

With the cushion assembled, it may be packaged for shipping.

Features from different embodiments of the disclosed subject matter may be employed in combination. Although the disclosure provides many specifics, the specifics should not be construed as limiting the scope of any of the claims, but merely as providing illustrations of some embodiments of elements and features of the disclosed subject matter that fall within the scopes of the claims. Other embodiments of the disclosed subject matter may be devised that are also within the scopes of the claims. Accordingly, the scope of each claim is limited only by its plain language and the legal equivalents thereto.

What is claimed:

1. A mold for use in manufacturing a cover for a cushion, comprising:

a first mold half including a first cavity and a first receptacle out of communication with the first cavity, the first receptacle positioned to receive (i) a seam securing a first panel and a second panel of the cover for the cushion and (ii) an opening of the cover between the first panel and the second panel when the first panel of the cushion is positioned against the first mold half; and a second mold half superimposable with the first mold half and positionable against the first mold half to capture the seam and the opening within the first receptacle and to capture the cover between the first mold half and the second mold half.

2. The mold of claim 1, wherein the first receptacle of the first mold half is also positioned to receive a zipper of the cover for the cushion and the second mold half is positionable against the first mold half to capture the zipper within the first receptacle.

3. The mold of claim 1, wherein the second mold half includes a second receptacle superimposable with the first receptacle of the first mold half, the second mold half positionable against the first mold half to capture the seam within the first receptacle and the second receptacle.

4. The mold of claim 1, wherein the first cavity of the first mold half comprises a grid cavity that opens to the first panel of the cover for the cushion when the first mold half and the second mold half are assembled with the cover for the cushion and with each other.

5. The mold of claim 1, wherein the second mold half includes a second cavity.

6. The mold of claim 5, wherein, with the first mold half and the second mold half in an assembled relationship, the second cavity is a mirror image of the first cavity.

7. The mold of claim 5, wherein, with the first mold half and the second mold half in an assembled relationship, the second cavity is offset from the first cavity.

8. A mold assembly for use in manufacturing a cover for a cushion, comprising:

a first mold half including a first cavity and a first receptacle, the first receptacle being out of communication with the first cavity; and a second mold half including a second cavity and a second receptacle, the second receptacle being out of communication with the second cavity, the second mold half superimposable with the first mold half in an assembled relationship, the second receptacle being superimposed with the first receptacle upon placement of the first mold half and the second mold half in the assembled relationship, the first receptacle and the second receptacle superimposable to receive (i) a seam securing a first panel and a second panel of the cover for the cushion and (ii) an opening of the cover between the first panel and the second panel when the cover is positioned between the first mold half and the second mold half.

9. The mold assembly of claim 8, wherein at least one of the first receptacle of the first mold half and the second receptacle of the second mold half is positioned to receive a zipper of the cover for the cushion when the cover is positioned between the first mold half and the second mold half.

10. The mold assembly of claim 8, wherein at least one of the first cavity of the first mold half and the second cavity of the second mold half comprises a cavity for defining a grid on the first panel or the second panel of the cover for the cushion.

11. The mold assembly of claim 8, wherein, with the first mold half and the second mold half in the assembled relationship, the first cavity and the second cavity are mirror images of each other.

12. The mold assembly of claim 8, wherein, with the first mold half and the second mold half in the assembled relationship, the second cavity is offset from the first cavity.

13. The mold assembly of claim 8, further comprising: the cover for the cushion.

* * * * *